US010389642B2

(12) United States Patent
Raney

(10) Patent No.: US 10,389,642 B2
(45) Date of Patent: *Aug. 20, 2019

(54) CLOUD-BASED NETWORK TOOL OPTIMIZERS FOR SERVER CLOUD NETWORKS

(71) Applicant: Keysight Technologies Singapore (Holdings) Pte. Ltd., Singapore (SG)

(72) Inventor: Kristopher Raney, Round Rock, TX (US)

(73) Assignee: Keysight Technologies Singapore (Sales) Pte. Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 15/812,067

(22) Filed: Nov. 14, 2017

(65) Prior Publication Data

US 2018/0077071 A1 Mar. 15, 2018

Related U.S. Application Data

(63) Continuation of application No. 15/251,529, filed on Aug. 30, 2016, now Pat. No. 9,847,947, which is a (Continued)

(51) Int. Cl.
*G06F 15/173* (2006.01)
*H04L 12/851* (2013.01)
(Continued)

(52) U.S. Cl.
CPC ...... *H04L 47/2441* (2013.01); *H04L 12/4641* (2013.01); *H04L 41/0873* (2013.01);
(Continued)

(58) Field of Classification Search
CPC ............. H04L 47/2441; H04L 12/4641; H04L 41/0873; H04L 41/0893; H04L 41/20;
(Continued)

(56) References Cited

U.S. PATENT DOCUMENTS 5,515,376 A 5/1996 Murthy et al.
6,321,259 B1 11/2001 Oullette et al.
(Continued)

OTHER PUBLICATIONS

S. Edwards, "Vulnerabilities of Network Intrusion Detection Systems: Realizing and Overcoming the Risks; The Case for Flow Mirroring," Top Layer Networks, Inc., May 1, 2002.
(Continued)

*Primary Examiner* — Cheikh T Ndiaye

(57) ABSTRACT

Network tool optimizers for server cloud networks and related methods are disclosed. In part, master filters are defined to segregate and control user traffic, and user filters are defined to forward the user traffic to cloud-based network tools or tool instances. A master user interface and user interfaces for each user are provided so that the master filters and user filters can be defined and managed. A filter rules compiler within the cloud-based network tool optimizer then combines the master filters with the user filters, resolves conflicts in favor of the master filters, and generates filter engine rules that are applied to filter engines within the network tool optimizer for the cloud network. The filter engines then forward packets received at input ports for the network tool optimizer to output ports for the network tool optimizer that are coupled to network tools or tool instances within the cloud network.

20 Claims, 9 Drawing Sheets

Related U.S. Application Data continuation of application No. 14/290,343, filed on May 29, 2014, now Pat. No. 9,467,385.

(51) Int. Cl.
| | | |
|---|---|---|
| *H04L 29/08* | (2006.01) | |
| *H04L 12/46* | (2006.01) | |
| *H04L 29/06* | (2006.01) | |
| *H04L 12/24* | (2006.01) | |
| *H04L 12/26* | (2006.01) | |

(52) U.S. Cl.
CPC .......... *H04L 41/0893* (2013.01); *H04L 41/20* (2013.01); *H04L 41/22* (2013.01); *H04L 41/5096* (2013.01); *H04L 43/14* (2013.01); *H04L 67/10* (2013.01); *H04L 69/22* (2013.01)

(58) Field of Classification Search
CPC ..... H04L 41/22; H04L 41/5096; H04L 43/00; H04L 43/14; H04L 67/10; H04L 69/22
See application file for complete search history.

(56) References Cited

U.S. PATENT DOCUMENTS

| | | |
|---|---|---|
| 6,578,147 B1 | 6/2003 | Shanklin et al. |
| 6,785,286 B1 | 8/2004 | O'Keeffe et al. |
| 6,839,349 B2 | 1/2005 | Ambe et al. |
| 6,853,623 B2 | 2/2005 | Nederveen et al. |
| 6,901,517 B1 | 5/2005 | Redmore |
| 6,920,112 B1 | 7/2005 | McCloghrie et al. |
| 6,954,775 B1 | 10/2005 | Shanklin et al. |
| 6,996,779 B2 | 2/2006 | Meandzija et al. |
| 7,016,980 B1 | 3/2006 | Mayer et al. |
| 7,027,437 B1 | 4/2006 | Merchant et al. |
| 7,142,518 B2 | 11/2006 | Mitchell |
| 7,143,196 B2 | 11/2006 | Rimmer et al. |
| 7,254,114 B1 | 4/2007 | Turner et al. |
| 7,245,620 B2 | 7/2007 | Shankar |
| 7,310,306 B1 | 12/2007 | Cheriton |
| 7,424,018 B2 * | 9/2008 | Gallatin .............. H04L 12/4645 370/389 |
| 7,554,984 B2 | 6/2009 | Kalkunte et al. |
| 7,688,727 B1 | 3/2010 | Ferguson et al. |
| 7,769,873 B1 | 8/2010 | Mackie |
| 7,889,711 B1 | 2/2011 | Minei et al. |
| 7,889,748 B1 * | 2/2011 | Leong ................ H04L 12/4645 370/249 |
| 7,917,647 B2 | 3/2011 | Cooper et al. |
| 8,018,943 B1 | 9/2011 | Pleshek et al. |
| 8,098,677 B1 | 1/2012 | Pleshek et al. |
| 8,200,203 B1 | 6/2012 | Christensen et al. |
| 8,447,718 B2 | 5/2013 | Norton et al. |
| 8,842,548 B2 | 9/2014 | Pleshek et al. |
| 8,902,895 B2 | 12/2014 | Pleshek et al. |
| 8,934,495 B1 | 1/2015 | Hilton et al. |
| 9,467,385 B2 | 10/2016 | Raney |
| 2001/0022786 A1 | 9/2001 | King et al. |
| 2001/0055274 A1 | 12/2001 | Hegge et al. |
| 2002/0186259 A1 | 12/2002 | Meandzija et al. |
| 2003/0046657 A1 | 3/2003 | White |
| 2003/0074421 A1 | 4/2003 | Kusano et al. |
| 2004/0003094 A1 | 1/2004 | See |
| 2004/0042470 A1 | 3/2004 | Cooper et al. |
| 2004/0103321 A1 | 5/2004 | Wesinger, Jr. et al. |
| 2004/0107361 A1 | 6/2004 | Redan et al. |
| 2004/0196841 A1 | 10/2004 | Tüdor et al. |
| 2005/0053073 A1 | 3/2005 | Kloth et al. |
| 2005/0182950 A1 | 8/2005 | Son et al. |
| 2006/0256788 A1 | 11/2006 | Donahue |
| 2008/0008202 A1 | 1/2008 | Terrell et al. |
| 2008/0072292 A1 | 3/2008 | Narjala |
| 2008/0222731 A1 | 9/2008 | Dowd et al. |
| 2009/0007021 A1 | 1/2009 | Hayton |
| 2009/0013052 A1 | 1/2009 | Robarts et al. |
| 2009/0150996 A1 | 6/2009 | Haswell |
| 2009/0172148 A1 | 7/2009 | Underwood |
| 2009/0327903 A1 | 12/2009 | Smith et al. |
| 2010/0027554 A1 | 2/2010 | Kuthan et al. |
| 2010/0332618 A1 | 12/2010 | Norton et al. |
| 2011/0317694 A1 * | 12/2011 | Pleshek ................ H04L 43/028 370/389 |
| 2012/0079107 A1 | 3/2012 | Williams et al. |
| 2012/0106354 A1 | 5/2012 | Pleshek et al. |
| 2014/0204747 A1 * | 7/2014 | Yu .......................... H04L 47/41 370/235 |
| 2015/0207905 A1 * | 7/2015 | Merchant ................ H04L 69/22 370/390 |
| 2015/0312311 A1 * | 10/2015 | Subramanian ...... G06F 17/3051 709/223 |
| 2015/0350095 A1 | 12/2015 | Raney |
| 2016/0373363 A1 | 12/2016 | Raney |

OTHER PUBLICATIONS

A. Esson and J. Mannos, "Broadcom BCM5600 StrataSwitch; A Highly Integrated Ethernet Switch on a Chip," Broadcom Corporation, Hot Chips Aug. 17, 1999.
J. Magee, "The Case for IDS Balancing vs. a Switch," Top Layer Networks, Inc., May 2003.
G. Marshall, SC Magazine Reprint, "Attack Mitigator," Aug. 2002.
F. Muhtar, "Appliances to Boost Network Defence," CyberSecurity Malaysia, Nov. 26, 2001.
National Information Assurance Partnership, "Common Criteria Evaluation and Validation Scheme, Validation Report; Top Layer Networks; IDS BalancerTM Version 2.2 Appliance (IDSB3531-CCV1.0, IDSB3532-CCV1.0, IDSB4508-CCV1.0)," Report No. CCEVS-VR-04-0074, National Institute of Standards and Technology; National Security Agency, Sep. 3, 2004.
Radware, "Radware's Smart IDS Management; FireProof and Intrusion Detection Systems; Deployment and ROI," North America Radware, Inc.; International Radware, Ltd., Aug. 21, 2002.
SC Magazine Reprint, "IDS Balancer 3500 Appliance," Jul. 2002.
Top Layer Networks, Inc., "Top Layer Advances Scaleable Intrusion Detection With Industry Leading Multi-Gigabit Offering," Press Release, Mar. 10, 2003.
Top Layer Networks, Inc., "Product Enhancements Optimize Existing Network Intrusion Detection and Prevention Environments," Press Release, Aug. 18, 2003.
Top Layer Networks, Inc., "Case Study—IDS Balancer; Building an Intelligent Monitoring Layer Using the Top Layer IDS Balancer Ensures Full Security Coverage for University of California, Irvine," www.TopLayer.com; 2003.
Top Layer Networks, Inc., "IDS Balancer 3.0 Delivers Ultimate Flexibility in Selecting, Filtering and Distributing Network Traffic," Press Release, Oct. 20, 2004.
Top Layer Networks, Inc., "IDS Balancer; Aggregation, Filtering, and & Load Appliance," internet advertisement, wwwTopLayer.com., 2004.
Top Layer Networks, Inc., "APP Switch 2500; The Original Top Layer Device to Perfect the Art of Network Security," internet advertisement, www.TopLayer.com.
G. Hilton, et al., "Filtering Path View Graphical User Interfaces and Related Methods," U.S. Appl. No. 12/462,222, filed Jul. 31, 2009.
Cisco, White Paper, "VXLAN Overview: Cisco Nexus 9000 Series Switches", 2013, 10 pgs.

* cited by examiner

CLOUD-BASED NETWORK TOOL OPTIMIZERS FOR SERVER CLOUD NETWORKS

RELATED APPLICATIONS

This application is a continuation application of U.S. patent application Ser. No. 15/251,529, filed Aug. 30, 2016, and entitled "CLOUD-BASED NETWORK TOOL OPTIMIZERS FOR SERVER CLOUD NETWORKS," which is a continuation application of U.S. patent application Ser. No. 14/290,343, filed May 29, 2014, issued as U.S. Pat. No. 9,467,385, and entitled "CLOUD-BASED NETWORK TOOL OPTIMIZERS FOR SERVER CLOUD NETWORKS," each of which is hereby incorporated by reference in its entirety.

TECHNICAL FIELD OF THE INVENTION

This invention relates to managing network packets and providing network packets to network monitoring tools.

BACKGROUND

Packet-based data networks continue to grow in importance, and it is often desirable to monitor network traffic associated with these packet-based networks on an ongoing basis. To meet these monitoring needs, copies of network packets can be forwarded to diagnostic network monitoring tools. Packets are often forwarded using network hubs, test access ports (TAPs), and/or switched port analyzer (SPAN) ports available on network switches. For example, certain network switches produced by Cisco Systems include SPAN ports to which traffic on the switches are mirrored. It is also noted that other packet monitoring or access methods may also be used to acquire copies of network packets being communicated within a network infrastructure.

To help alleviate the problem of limited access to network packets for monitoring, tool aggregation devices have been developed that allow shared access to the monitored network packets. These tool aggregation devices allow users to obtain packets from one or more network monitoring points (e.g., network hub, TAP, SPAN port, etc.) and to forward them to different monitoring tools. U.S. Pat. Nos. 8,018,943 and 8,098,677 describe example embodiments for network tool optimizers that provide solutions for packet filtering and provide, in part, configuration of user-define filters, automatic creation of filter engine forwarding rules, automatic handling of filter overlaps, graphical user interfaces (GUIs) for filter creation, and other features. U.S. Pat. Nos. 8,018,943 and 8,098,677 is each hereby incorporated by reference in its entirety.

When a network to be monitored includes a cloud or virtual environment, however, difficulties arise in utilizing prior tool aggregation devices particularly where multiple unrelated users are allocated different cloud resources within the cloud or virtual environment. One such example environment is where resources within a server cloud are offered by a controlling entity (e.g., Amazon Web Services) to different user entities that lease, rent, or otherwise pay for server cloud resources from the controlling entity. If these user entities desire to monitor network activity, the preferred place to conduct such monitoring is often within the network infrastructure for the server cloud. However, as the server cloud is not controlled by or directly accessible to the user entities, this cloud network monitoring is impractical to implement using current tool aggregation devices without the controlling entity opening its network infrastructure to the user entities. Further, the controlling entity of the server cloud typically does not want its network infrastructure or traffic to be visible to the user entities Even assuming the controlling entity (e.g., Amazon Web Services) is willing to connect a monitoring tool to its server cloud so that copies of packet traffic are forwarded to a monitoring tool (e.g., through a hub, TAP, SPAN port, etc.) desired to be used by a user, these packets will likely include packets for other user entities in addition to the user desiring the network monitoring. This overlap in packet traffic is likely to occur because cloud resources are often virtualized such that processors or cores associated with any particular physical server processing platform (e.g., server blade) may be used by two or more user entities through server instances created within the server processing system platform. Traffic copied from this physical server processing system platform, therefore, will likely include packets that are associated with multiple independent user entities using the different server instances. As such, significant security and confidentiality issues arise if an attempt is made to add network monitoring tools and associated monitoring services to server cloud resources being used and shared by user entities.

SUMMARY OF THE INVENTION

Network tool optimizers for server cloud networks and related methods are disclosed that allow sharing of cloud-based network tool resources while still securing user packet traffic. In part, master filters are defined by the service provider for the server cloud resources to segregate and control user traffic, and user filters are defined by each user so that the user's traffic is forwarded to cloud-based network tools desired to be used by the users. A master user interface and user interfaces for each user are provided by the cloud-based network tool optimizer so that master filters and user filters can be defined and managed. A filter rules compiler within the cloud-based network tool optimizer then combines the master filters with the user filters, resolves conflicts in favor of the master filters, and generates filter engine rules that are applied to filter engines within the cloud-based network tool optimizer. The filter engines then forward packets received from the cloud network at input ports for the cloud-based network tool optimizer to output ports for the cloud-based network tool optimizer based upon the user filters as controlled by the master filters. The output ports are in turn coupled to network tools or network tool instances within the cloud network. As such, server cloud resources can include network monitoring services while still protecting the security of the service provider's internal network traffic and the network traffic for the different user entities. Different features and variations can be implemented, as desired, and related systems and methods can be utilized, as well.

In one embodiment, a method is disclosed for configuring and operating a network tool optimizer for cloud-based networks including allowing configuration of one or more master filters to determine how packets from a cloud network are forwarded to a plurality of virtual ports where each virtual port is associated with a different user of cloud resources within the cloud network, allowing configuration of a plurality of sets of one or more user filters where each set of one or more user filters is associated with a different user of cloud resources within the cloud network and determines how packets from a virtual port associated with that user are forwarded to one or more output ports for the network tool optimizer, generating rules for filter engines based upon the one or more master filters and the plurality of sets of one or more user filters with conflicts between the master filters and user filters being resolved in favor of the master filters, applying the rules to the filter engines within the network tool optimizer, receiving packets from the cloud network at one or more input ports for the network tool optimizer, and forwarding the received packets to one or more output ports for the network tool optimizer using the filter engines so that packet traffic for each user is forwarded based at least in part upon the set of one or more user filters for that user.

For other embodiments, the method also includes forwarding packets from the one or more output ports to one or more network monitoring tools coupled to the one or more output ports. In addition, the method can include forwarding packets from one or more output ports to one or more network monitoring tool instances created within a processing system platform coupled to the one or more output ports. Further, the received packets can include copies of packets output by one or more servers within the cloud network. Still further, the received packets can include copies of packets output by one or more server instances created by a processing system platform within the cloud network.

For further embodiments, the allowing steps can include providing a master user interface to allow configuration of the master filters and providing one or more user interfaces to allow configuration of the user filters. In addition, the one or more user interfaces can include a separate user interface for each user. Still further, the method can include displaying only information relating to each user in the user interface for that user.

For additional embodiments, the filter engines can include one or more ingress filter engines associated with input ports for the network tool optimizer and one or more egress filter engines associated with output ports for the network tool optimizer. Further, the method can also include applying rules associated with the master filters to the one or more ingress filter engines and applying rules associated with the user filters to the one or more egress filter engines.

For still further embodiments, the one or more master filters are configurable to separate network traffic for different users of the cloud resources using one or more network identifiers for user packets. In addition, the network identifiers comprise virtual local area network (VLAN) identifiers, virtual extensible local area network (VXLAN) identifiers, or both VLAN and VXLAN identifiers. Further, the one or more network identifiers can be made not available for configuration of the plurality of sets of one or more user filters. Still further, the method can include allowing configuration of one or more master filters to add one or more network identifiers to the user packets forwarded to the one or more output ports for the network tool optimizer.

In one other embodiment, a network tool optimizer for cloud-based networks is disclosed that includes a plurality of input ports to receive network packets, a plurality of output ports to output network packets, a packet switch having filter engines that determine how network packets are forwarded from the input ports to the output ports within the network tool optimizer, a master user interface to allow configuration of one or more master filters that determine how packets from the input ports are forwarded to a plurality of virtual ports where each virtual port is associated with a different user of cloud resources within a cloud network, one or more user interfaces to allow configuration of a plurality of sets of one or more user filters to determine how packets from a virtual port associated with a user are forwarded to one or more output ports for the network tool optimizer where each set of one or more user filters is associated with a different user of cloud resources within the cloud network, and a filter processor to generate rules for the filter engines based upon the one or more master filters and the plurality of sets of one or more user filters with conflicts between the master filters and user filters being resolved in favor of the master filters and to apply the rules to the filter engines to forward packet traffic for each user based at least in part upon the set of one or more user filters for that user.

For other embodiments, the one or more user interfaces include a separate user interface for each user. In addition, each user interface can be configured to display only information relating to its user.

For further embodiments, the filter engines can include one or more ingress filter engines associated with input ports for the network tool optimizer and one or more egress filter engines associated with output ports for the network tool optimizer. In addition, the filter processor can be further configured to apply rules associated with the master filters to the one or more ingress filter engines and to apply rules associated with the user filters to the one or more egress filter engines.

For additional embodiments, the one or more master filters are configurable to separate network traffic for different users of the cloud resources using one or more network identifiers for user packets. Further, the network identifiers can include virtual local area network (VLAN) identifiers, virtual extensible local area network (VXLAN) identifiers, or both VLAN and VXLAN identifiers. In addition, the one or more network identifiers can be made not available for configuration of the plurality of sets of one or more user filters. Still further, the master interface can be further configured to allow configuration of one or more master filters to add one or more network identifiers to the user packets forwarded to the one or more output ports for the network tool optimizer.

Different features and variations can be implemented, as desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Figure 1:
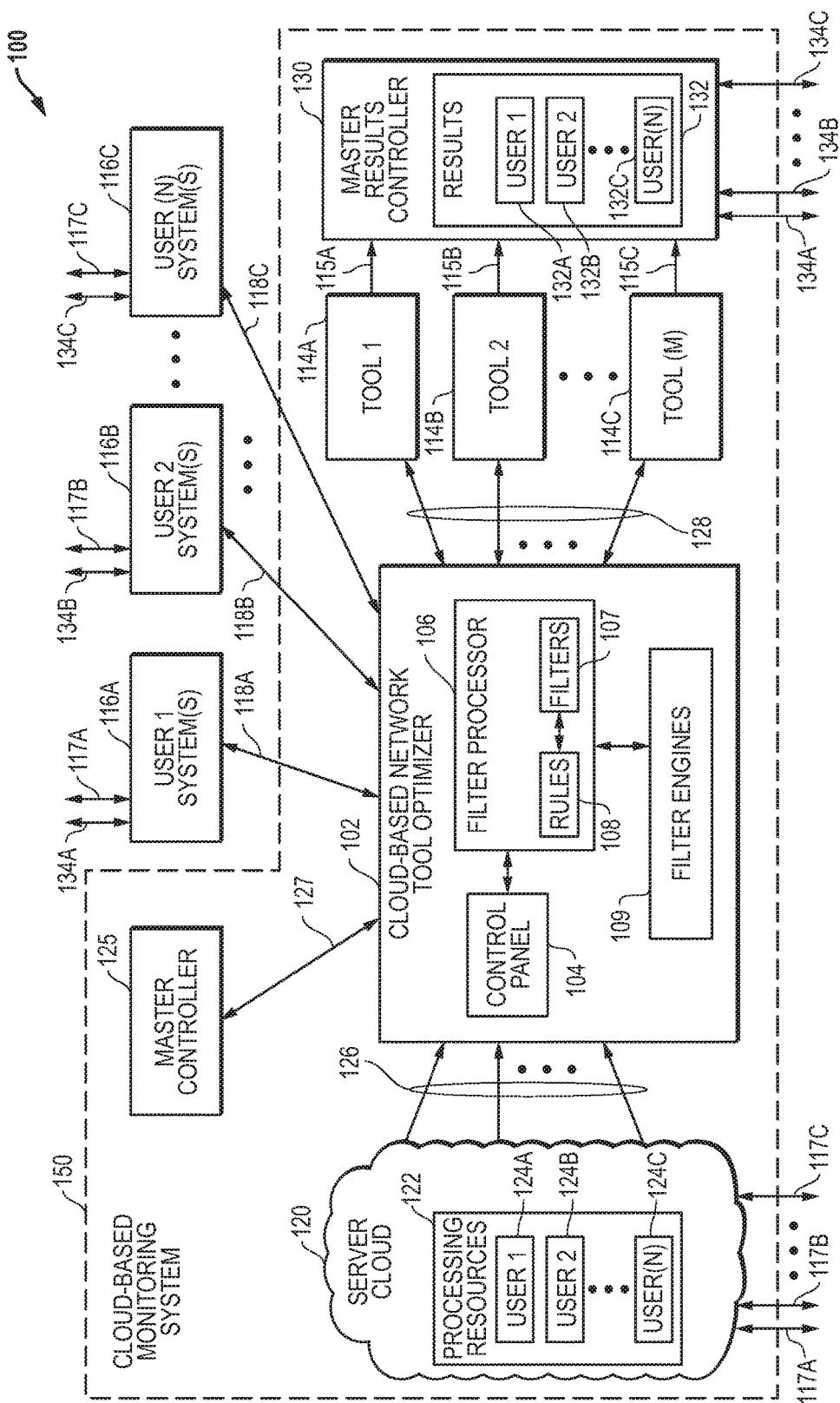
FIG. 1 is a block diagram of an example embodiment for a cloud services environment including a cloud-based monitoring system having a cloud-based network tool optimizer.

Network tool optimizers for server cloud networks and related methods are disclosed that allow sharing of cloud-based network tool resources while still securing user packet traffic. In part, master filters are defined by the service provider for the server cloud resources to segregate and control user traffic, and user filters are defined by each user so that the user's traffic is forwarded to cloud-based network tools desired to be used by the users. A master user interface and user interfaces for each user are provided by the cloud-based network tool optimizer so that master filters and user filters can be defined and managed. A filter rules compiler within the cloud-based network tool optimizer then combines the master filters with the user filters, resolves conflicts in favor of the master filters, and generates filter engine rules that are applied to filter engines within the cloud-based network tool optimizer. The filter engines then forward packets received from the cloud network at input ports for the cloud-based network tool optimizer to output ports for the cloud-based network tool optimizer based upon the user filters as controlled by the master filters. The output ports are in turn coupled to network tools or network tool instances within the cloud network. As such, server cloud resources can include network monitoring services while still protecting the security of the service provider's internal network traffic and the network traffic for the different user entities. Different features and variations can be implemented, as desired, and related systems and methods can be utilized, as well.

The disclosed cloud-based network tool optimizer embodiments, therefore, utilize two broad types of hierarchical packet filters to provide for secured monitoring by a network tool with a server cloud. The hierarchical packet filters include master filters and user filters. The master filters provide the highest level packet access control. These master filters are defined and managed by the controlling entity for the server cloud (e.g., Amazon Web Services). Hierarchically, these master filters sit above the individual sets of user filters. Each set of user filters are defined and managed by customers of the server cloud that have been granted access to use monitoring tool resources within the server cloud environment. Each customer or user has access only to its own packet streams, and the master filters operate to trump or narrow the user filters. Using this system, an administrator for the server cloud can specify restrictions or limitations with regard to what data and/or types of data any given user with access to the cloud-based network tool optimizer is permitted to see. As such, each user's traffic can be segregated from other user traffic and/or the internal network traffic for the controlling entity of the server cloud network itself. A variety configurations and implementations can be used while still taking advantage of the cloud-based network tool optimizer embodiments described herein.

FIG. 1 is a block diagram of an example embodiment for a cloud services environment 100 including a cloud-based monitoring system 150 having a cloud-based network tool optimizer 102. The cloud-based monitoring system 150 communicates with multiple user systems 116A, 116B . . . 116C through one or more network communication links to provide cloud application services using the server cloud 120 and cloud monitoring services using the cloud-based network tool optimizer 102. Although the discussion below focuses on the use of a single cloud-based network tool optimizer, it is noted that multiple different cloud-based network tool optimizers could be used, as desired, to provide cloud-based monitoring services to users of the server cloud resources.

With respect to traditional cloud application services, the server cloud 120 includes server processing resources 122 such as processing devices and/or processing cores located on one or more server processing systems (e.g., server blades). Different portions of these server processing resources 122 are allocated to the multiple user systems 116A, 116B . . . 116C to run one or more user software applications. As depicted, a first processing resource subset 124A is allocated for use by the first user system(s) 116A. A second processing resource subset 124B is allocated for use by the second user system(s) 116B. Additional processing resource subsets can be allocated to additional user system(s) with an Nth processing resource subset 124C being allocated for use by an Nth user system(s) 116C. The application traffic associated with these cloud application services is communicated between the server cloud 120 and the user systems 116A, 116B . . . 116C through one or more network communications 117A, 117B . . . 117C, respectively. Traditional cloud application services are often provided by entities having large server farms and/or large excess sever capabilities that are made accessible through network interfaces (e.g., Amazon Web Services). Further, as described in the Background above, in addition to allocating individual server processing systems to users, service providers also create virtual server instances within larger computing platforms and allocate these instances for use by users.

Advantageously, the embodiments described herein provide cloud-based monitoring services in addition to cloud application services through the cloud-based network tool optimizer 102. The cloud-based network tool optimizer 102 receives copies of packet traffic from the network for the server cloud 120 through one or more network connections 126 and forwards these packets to one or more network monitoring tools 114A, 114B . . . 144C through network connections 128 based upon filter rules 108 applied to filter engines 109. As described in more detail below, the cloud-based network tool optimizer 102 allows a master controller 125 to view, define and/or manage master filters within filters 107 through network communications 127. The cloud-based network tool optimizer 102 also allows users 116A, 116B . . . 116C to view, define and/or manage user filters within filters 107 through network communications 118A, 118B . . . 118C, respectively. The filter processor 106 within the cloud-based network tool optimizer 102 automatically generates the packet forwarding rules 108 based upon the forwarding instructions defined by the master/user filters 107.

As described herein, the master filters are applied first and can override conflicting forwarding requests within the user filters. This master-to-user hierarchy allows the service provider to protect its own network traffic from exposure to the users and to keep each user's traffic from being exposed to other users while still allowing each user to control the forwarding actions of its own traffic to one or more cloud-based network monitoring tools. Once generated, the packet forwarding rules 108 are applied by the filter processor 106 to filter engines 109 to determine how packets are forwarded by the cloud-based network tool optimizer 102 from input ports that receive server cloud traffic to output ports that provide packets to the network tools 114A, 114B . . . 114C. The cloud-based network tool optimizer 102 also includes a control panel 104 that provides user interfaces (UIs) such as graphical user interfaces (GUIs) that allow the master controller 125 and the user system(s) 116A, 116B . . . 116C to view, create and/or manage the master/user filters 107. For the embodiment 100, the results generated by tools 114A, 114B . . . 114C are provided to a master results controller 130 that controls the distribution of the different user results 132A, 132B . . . 132C to the appropriate user system(s) 116A, 116B . . . 116C as represented by network communications 134A, 134B . . . 134C. The tools 114A, 114B . . . 114C could also communicate these results directly back to the user system(s) 116A, 116B . . . 116C through network connections, if desired. Through the cloud-based network tool optimizer 102, therefore, each of the user system(s) 116A, 116B . . . 116C is allowed secured access to monitoring tool services relating to its network traffic generated within the server could 120. It is noted that network communications 117A-C, 118A-C, and 134A-C can be implemented using one or more network communication links between the cloud-based monitoring system 150 and the user systems 116A-C, as desired.

It is noted that the copied packets provided by connections 126 from packet flows within the network infrastructure for the server cloud 120 can be obtained through one of a variety of techniques and devices, such as for example, from network TAPs, from SPAN ports on network switches, and/or from other devices or systems that copy packets or packet contents from network traffic flows and make them available for other devices and systems. It is also noted that the connections and network communications described herein can include wired, wireless, and/or combinations of wired and wireless network communications among network-connected devices or systems and can include communications through one or more intervening devices or systems, such as firewalls, routers, switches, and/or other network-connected devices or systems. It is further noted that the control panel 104 for the cloud-based network tool optimizer 102 can be implemented as a web interface that can be accessed through a network browser (e.g., MICROSOFT Internet Explorer or MOZILLA Firefox) by other network-connected processing systems. For example, the cloud-based network tool optimizer 102 can be configured to automatically download a control panel software application to user system(s) 116A, 116B . . . 116C or the master controller 125 when a network browser operating on the management platform connects to an IP address for the cloud-based network tool optimizer 102. This download can occur the first time the network browser connects, and the control panel 104 can then be stored locally by the management platform. The user system(s) 116A, 116B . . . 116C, the master controller 125, and/or the master results controller 130 can be, for example, personal computer systems, server systems, and/or other processing systems running WINDOWS operating systems, LINUX operating systems, and/or other operating system as desired. In one embodiment, the control panel 104 can in part be downloaded as JAVA-based software code or modules. Other implementations could also be implemented.

It is further noted that the cloud-based monitoring system 150 can include any of a wide variety of systems that are connected within a cloud server environment. These systems can include server systems, data storage systems, desktop computer systems, portable computer systems, network switches, broadband routers and/or any other desired processing systems that are connected into a cloud network, as desired. In addition to these systems, any number of network monitoring tools 114A, 114B . . . 114C can also be connected to the cloud network and/or to systems within the network. Further, the network monitoring tools 114A, 114B . . . 114C be can any of a wide variety of network related tools including traffic monitoring devices, packet sniffers, data recorders, voice-over-IP monitors, intrusion detection systems, network security systems, application monitors and/or any other desired network management or security tool device or system. Still further, as described herein, the network monitoring tools 114A, 114B . . . 114C can also be implemented as virtual instances of tool appliances within a larger computing platform. It is further noted that the network communications can be based upon any desired protocol or combination of protocols including Ethernet protocols, multi-protocol label switching (MPLS) protocols, FibreChannel (FC) protocols and/or any other desired communication protocol that can be used for network communications including packet-based network communications.

It is also noted that the user-defined and master-defined filters 107 as well as the forwarding engine rules 108 generated by the filter processor 106 can rely upon various portions of the content of network packets for forwarding actions. For example, network packets typically include in part a link layer header (L2), a network layer header (L3), a transport layer header (L4) and a payload, as well as other network layers (e.g., layers within the Open Systems Interconnect (OSI) model for network communications). Information pertinent to forwarding the packet, such as source ID and destination ID and protocol type, is usually found in the packet headers. These packets may also have various other fields and information within them, such as fields including error check information, virtual local area network (VLAN) identifiers, and/or other information that may be matched and used for filtering. Further, information representing the source device may include items such as the IP address of the source device or the MAC (Media Access Control) address of the source device. Similarly, information representing the destination device may be included within the packet such as the IP address of the destination device. It is seen, therefore, that a wide variety of source and destination identifying information may be included within the packets as well as other packet related information along with the data included within the payload of the packet. While the cloud-based network tool optimizer embodiments described herein are primarily described with respect to packet-based communications and utilize information within these packets to forward the packets, the cloud-based network tool optimizer embodiments can be configured to operate with respect to other types of communication protocols and are not limited to packet-based networks.

Figure 2A:
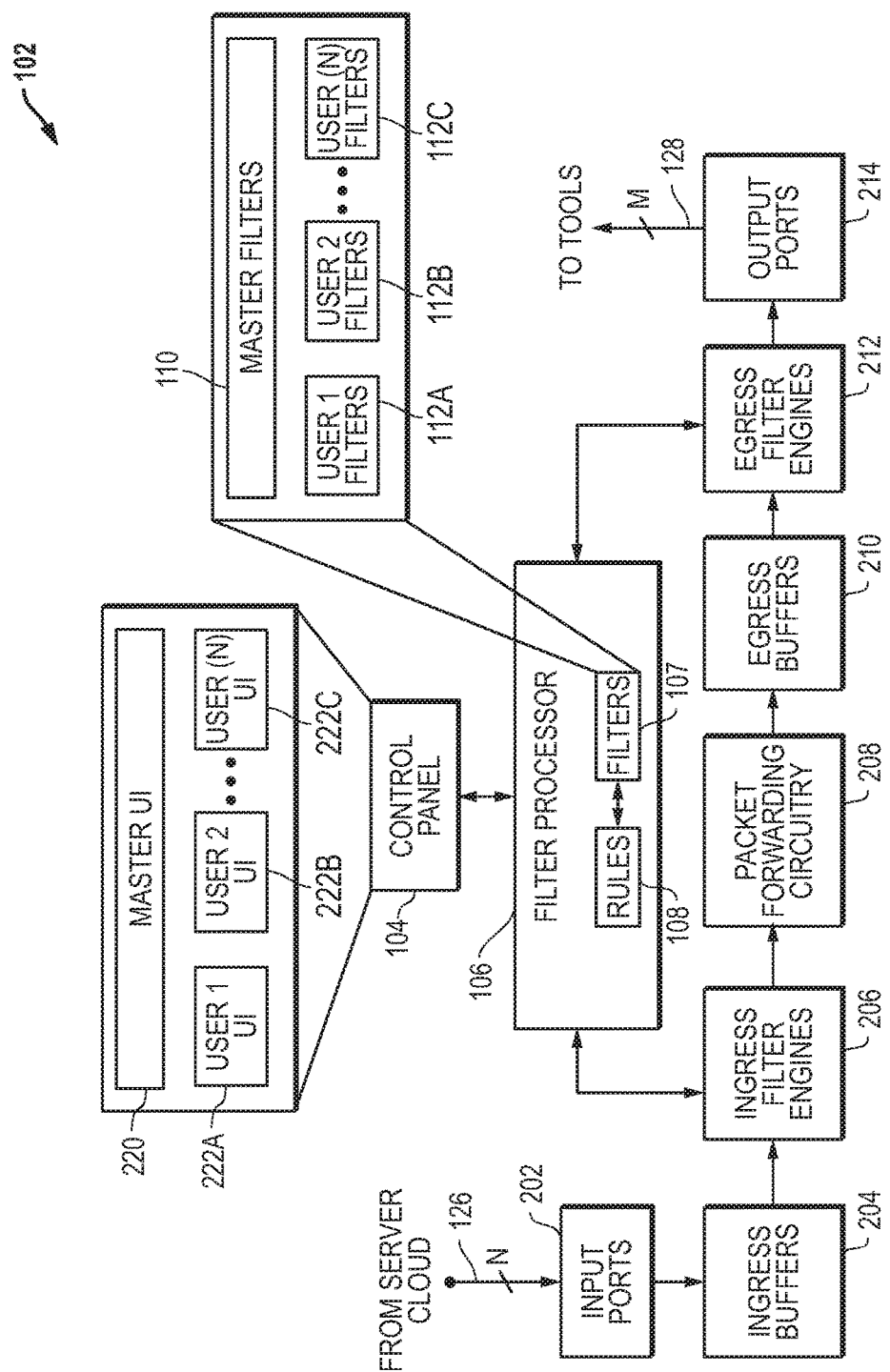
FIG. 2A is a block diagram for an example embodiment for a cloud-based network tool optimizer.

FIG. 2A is a block diagram for an example embodiment for cloud-based network tool optimizer 102. As described with respect to FIG. 1, the cloud-based network tool optimizer 102 includes a control panel 104 that provides management access to master controller 125 and user systems 116A, 116B . . . 116C. The control panel 104 in part provides a master user interface (UI) 220 through which the master controller 115 can define, manage, and control the master filters 110. The control panel 104 also in part provides one or more individual user interfaces (UIs) 222A, 222B . . . 222C through which users 116A, 116B . . . 116C can define, manage, and control user filters 112A, 112B . . . 112C. The filter processor 106 for the cloud-based network tool optimizer 102 processes the master filters 110 and user filters 112A, 112B . . . 112C to generate forwarding rules 108 for filter engines, such as ingress filter engines 206 and egress filter engines 212, and then applies these forwarding rules 108 to the filter engines 206/212. In particular, the filter processor 106 logically combines the master filters 110 and the user filters 112A-C to generate the forwarding rules 108 such that the master filters 110 trump or govern any conflicting forwarding actions set forth in the user filters 112A-C.

In operation, the forwarding rules 108 determine at least in part how the filter engines 206/212 forward packets from input ports 202 to output ports 214 for the cloud-based network tool optimizer 102 through packet forwarding circuitry 208. The packet forwarding circuitry 208 forwards packets between input ports 202 and output ports 214 based in part upon the forwarding rules 108 set up in the ingress filter engines 206 and the egress filter engines 212. For the embodiment depicted, packets from N connections 126 are received at the input ports 202. These packets are then stored in ingress queues or buffers 204 prior to being processed by ingress filter engines 206. Based upon ingress filter rules within the ingress filter engines 206, the packet forwarding circuitry 208 forwards packets to the appropriate output ports 214. However, prior to being sent out the output ports 214 to external systems, the outgoing packets are first stored in egress queues or buffers 210 and then processed by egress filter engines 212. Based upon egress filter rules within the egress filter engines 212, the egress filter engines 212 forward the appropriate packets to the output ports 214. The output ports 214 are connected to network tools through M connections 128. The filter processor 106 communicates with the ingress filter engines 206 and egress filter engines 212 to apply the forwarding rules 108 so that these filter engines will provide the packet forwarding defined by the user filters 112A, 112B . . . 112C within limits controlled by the higher level master filters 110.

It is noted that the cloud-based network tool optimizer 102 can be implemented using one or more network packet switch integrated circuits (ICs), such as are available from Broadcom Corporation. These switch integrated circuits include input port circuitry, ingress buffer circuitry, ingress filter engine circuitry, packet switch fabric circuitry, egress buffer circuitry, egress filter engine circuitry, output port circuitry, internal processors and/or other desired circuitry. Further these integrated circuits can include control and management interfaces through which they can be programmed to provide desired forwarding and control. As such, the filter processor 106 can program the filter engines within the network packet switch integrated circuit with appropriate forwarding rules. The cloud-based network tool optimizer 102 can also include other circuitry and components, as desired. For example, tool optimizer 102 can include one or more printed circuit boards (PCBs) upon which the network packet switch IC is mounted, power supply circuitry, signal lines coupled to external connections, and a variety of external connectors, such as Ethernet connectors, fiber optic connectors or other connectors, as desired. It is further noted that the cloud-based network tool optimizer 102 including the filter processor 106 can be implemented using one or more programmable processing devices. For example, the network packet switch ICs can be controlled and operated using a processor, microcontroller, configurable logic device (e.g., CPLD (complex programmable logic device), FPGA (field programmable gate array)), and/or other processing device that is programmed to control these integrated circuits to implement desired functionality. It is further noted that software or other programming instructions used for the cloud-based network tool optimizer 102 and/or its components, such as filter processor 106 and the control panel 104, can be implemented as software or programming instructions embodied in a non-transitory computer-readable medium (e.g., memory storage devices, FLASH memory, DRAM memory, reprogrammable storage devices, hard drives, floppy disks, DVDs, CD-ROMs, etc.) including instructions that cause processing devices used by the cloud-based network tool optimizer 102 to perform the processes, functions, and/or capabilities described herein.

In one embodiment for the cloud-based network tool optimizer 102, a PCB can include a processor IC separate from a network packet switch IC. The filter processor 106 can then be configured to operate on the separate processor IC, and the separate processor IC can interface with an application programming interface (API) provided by the network packet switch vendor for the network packet switch IC. This API provides an abstracted programmatic interface with which to apply filter rules to the filter engines within a network packet switch IC to control how packets are forwarded by the packet switch IC within the cloud-based network tool optimizer 102.

As described herein, the cloud-based network tool optimizer 102 automatically implements master filters 110 and user filters 112A-C as one or more forwarding rules 108 that are applied to filter engines 109. The forwarding rules 108 represent the internal device specific representations that are used to implement the filter engine rules. For current packet switch ICs, these device specific representations often include programming or provisioning of filter rules into ternary content-addressable memories (TCAMs) within the packet switch ICs. A filter rule typically includes a predicate and one or more action(s). The predicate is one or more traffic-matching criteria that are logically AND-ed together (e.g., TCAM matching criteria such as VLAN ID or Source IP address). Each predicate compares a key to a value. The key is computed by selecting fields from packets based on protocol and content of the packet. An action can be defined by the filtering rule and applied when a match occurs. For current TCAMs (and packet switch IC filter engines), actions typically include where to forward the packet, whether to drop the packet, and/or other desired action(s) with respect to the packet. For example, additional actions can include adding headers, adding identifiers within headers, stripping headers, stripping identifiers within headers, and/or other additional actions to modify packet contents.

Based upon the applied filter rules 108, the filter engines 109, such as ingress filter engines 206 and egress filter engines 212, conditionally direct traffic from the input ports to the output ports. Filter rules can specify a single traffic-matching criteria or they can involve Boolean expressions that logically combine various traffic-matching criteria to represent the desired filtering behavior. Further, the various criteria in the filter may include ranges and/or non-contiguous lists of values which effectively allow for a second level of OR-ing within the filters. In addition, other logic, such as NOT operations, and/or more complicated logic expressions such as source/destination pairs and bidirectional flows could also be represented in filter rules, if desired. A filter's traffic-matching criteria can be configured as desired. For example, matching criteria can be configured to include values in any ISO (International Standards Organization) OSI network layer 2 (L2) through layer 7 (L7) header value or packet content. It is noted that packet-based communications are often discussed in terms of seven communication layers under the OSI model: application layer (L7), presentation layer (L6), session layer (L5), transport layer (L4), network layer (L3), data link layer (L2), and physical layer (L1). Examples of traffic-matching filter criteria for packet-based communications include but are not limited to:

Layer 2 (L2): Source/Destination MAC address, VLAN, Ethertype
Layer 3 (L3): Source/Destination IP address, IP Protocol, Diffserv/TOS
Layer 4 (L4): Source/Destination L4 Port, TCP Control flags It is noted that these L2-L4 criteria are useful because existing hardware designs for packet switch ICs parse these packet headers. However, packet switch devices can be improved by extending filter capabilities to layers 5-7 (L5-L7), and this additional filtering criteria can be used by the cloud-based network tool optimizer 102 as well.

Figure 2B:
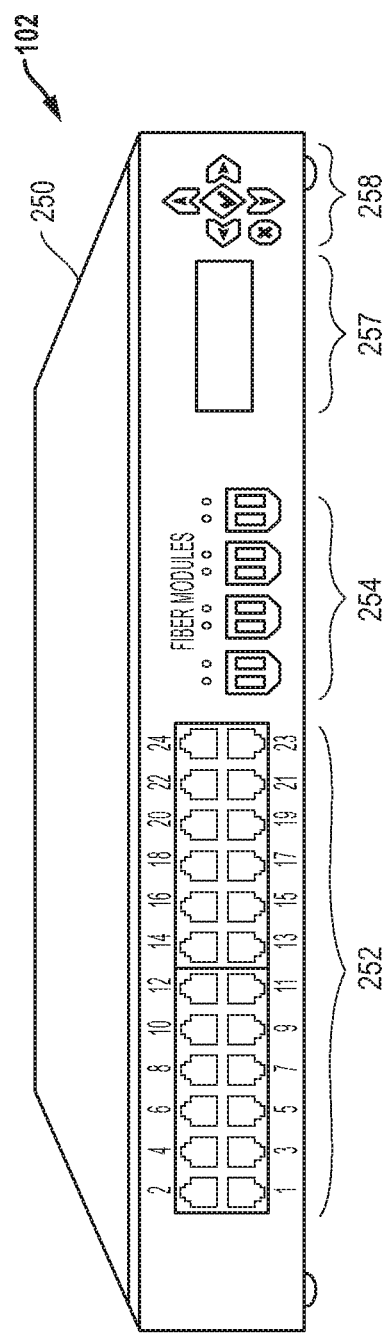
FIG. 2B is a diagram of an example embodiment for external connections associated with an example product configuration and housing for an example cloud-based network tool optimizer.

FIG. 2B is a diagram of an example embodiment for a product configuration as well as external connections for an example cloud-based network tool optimizer 102. As depicted, the cloud-based network tool optimizer 102 includes a housing 250 having external connections for a variety of connector types. For example, Ethernet port connectors 252 can be provided (e.g., Ethernet ports 1-24), and fiber optic connectors 254 can be provided for fiber modules. Further, a display screen, such a back-lit LCD screen 257, can also be included for displaying information related to the network tool optimizer 102. Direct navigation controls 258 can also be included, for example, for navigating management menus displayed in screen 257. Although not shown, a separate management network port can also be provided, for example, on the back of housing 250. This management network port can provide the control and management network interface to control panel 104 for the cloud-based network tool optimizer 102. It is further noted that circuitry for the network tool optimizer 102, including PCBs and power supply circuitry, can be mounted within the housing 250.

Figure 3A:
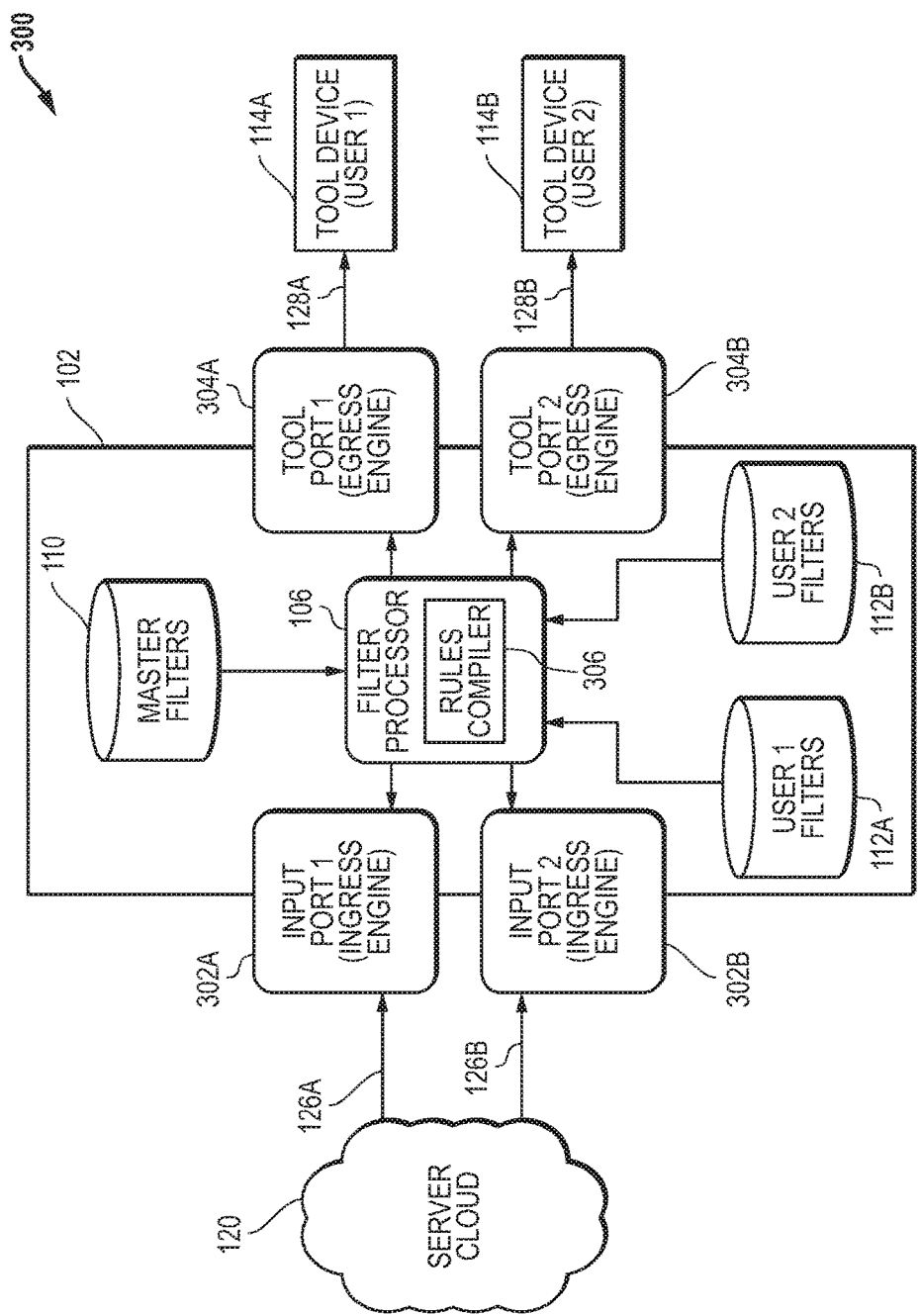
FIG. 3A is a block diagram of an embodiment where packet flows for two users are processed using a cloud-based network tool optimizer.

FIG. 3A is a block diagram of an embodiment 300 where packet flows for two users are processed using a cloud-based network tool optimizer 102. Master filters 110, first user filters 112A, and second filters 112B have been defined and stored in cloud-based network tool optimizer 102. A filter rules compiler 306 within the filter processor 106 analyzes the master filters 110 to determine master forwarding actions for received packets. The rules compiler 306 also analyzes the user filters 112A and 112B to determine forwarding actions desired by the individual users. As long as the user filters 112A and 112B do not conflict with the master filters 110 and are possible based upon user traffic for the users, these user filters 112A and 112B will be implemented by the rules compiler 306. As described above, the filter processor 106 generates forwarding rules 108 for filter engines 109 to cause the desired packet forwarding actions to be implemented. For embodiment 300, the filter processor 106 applies forwarding rules to an ingress engine associated with the first input port 302A, an ingress engine associated with input port 302B, an egress engine associated with output port 304A, and an egress engine associated with output port 304B so that the forwarding actions defined by the master filters 110 and user filters 112A/112B are implemented for the cloud-based network tool optimizer 102.

Advantageously, neither the service provider that controls the server cloud 120 or the individual users are required to program or apply the forwarding rules to the packet forwarding filter engines within the cloud-based network tool optimizer 102. Rather, the service provider defines and manages master filters 110 through the master UI 220, and the users define and manage the user filters 112A/112B through the user UIs 222A/22B, respectively. The forwarding rules 108 for the filter engines 109 are then automatically generated by the rules complier 306 by combining the master filters 110 with the user filters 112A/112B. For this combination, the master filters 110 will govern any conflicts, and the rules compiler 306 generates a set rules with appropriate settings or instructions for the filter engines in the packet forwarding switches used by the cloud-based network tool optimizer 102.

Looking back to embodiment 300, the server cloud 120 provides a first packet flow 126A to a first network port 302A and provides a second packet flow 126B to second network port 302B. These packet flows 126A/126B can be from different points within the network infrastructure for the server cloud 120 and can each include packets for one of the users and/or for both of the users. Through the operation of the ingress/egress filter engines associated with the input ports 302A, 302B, 304A, and 304B as well as internal switching circuitry, the cloud-based network tool optimizer 102 filters the packet flows 126A/126B as defined by the combination of the master filters 110 and the user filters 112A/112B so that selected packets are forwarded according to forwarding actions set forth in those filters. For embodiment 300, it is assumed that traffic for a first user is being forward by the cloud-based network tool optimizer 102 to a first tool device 114A through first output tool port 304A and connections 128A. Similarly, it is assumed that traffic for a second user is being forward by the cloud-based network tool optimizer 102 to a second tool device 114B through second output tool port 304B and connections 128B. The first user receives results from tool 114A, and the second user receive results from tool 114B.

Figure 3B:
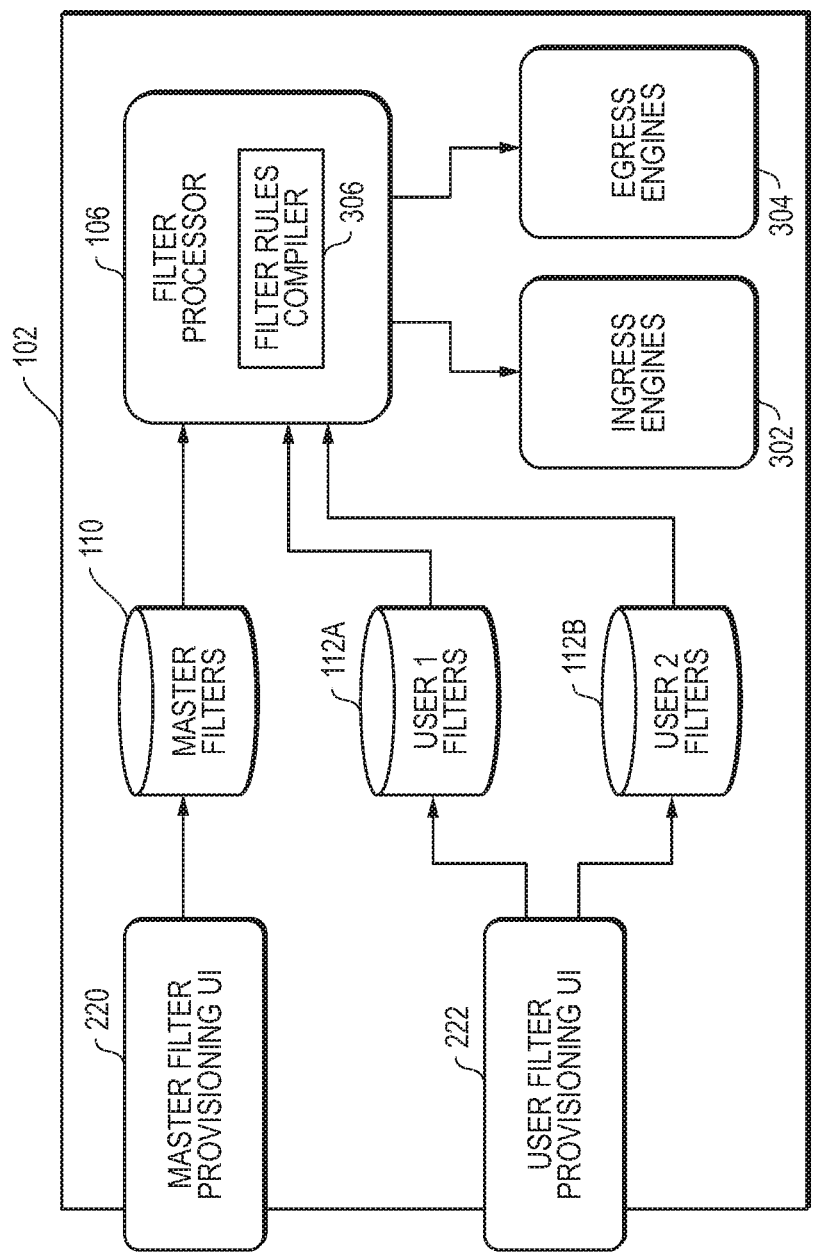
FIG. 3B is a block diagram of an embodiment for a cloud-based network tool optimizer showing user interfaces for configuration of master filters and user filters.

FIG. 3B is a block diagram of an embodiment for cloud-based network tool optimizer 102 showing user interfaces for configuring master and user filters. As described above, a master filter provisioning user interface (UI) 220 is used by the master controller 125 to define and manage the master filters 110. A user filter provisioning interface (UI) 222 is used by the first user 116A to define and manage the first user filters 112A and is used by the second user to define and manage the second user filters 112B. As described above the filter rules compiler 306 for the filter processor 106 analyzes and combines the master filters 110 and the user filters 112A and 112B to generate and apply forwarding rules for the ingress engines 302 and the egress engines 304. As such, the service provider entity that controls the server cloud 120 can access and control the master filters 110, and separate user entities that control the user systems 116A and 116B can access and control the user filters 112A and 112B. It is noted that the user interface (UI) 222 could be implemented as a common interface or could be implemented as multiple distinct user interfaces 222A, 222B . . . 222C as shown in FIG. 2A. Other variations could also be implemented.

Cloud-Based Monitoring Example with Service Provider and Two Users

One primary goal for the cloud-based network tool optimizer 102 is to allow the server cloud service provider (e.g., Amazon Web Services) to safely provide tool monitoring functionality to different users who do not want their network traffic to be seen or acquired by other users. To provide this security, the user interface for the cloud-based network tool optimizer 102 allows the users to manage forwarding actions but with a scope limited to traffic that falls within their own resource domains. Further, the network tool optimizer 102 also allows the server provider (e.g., Amazon Web Services) to protect its own network infrastructure and network traffic from visibility to the users.

Figure 4A:
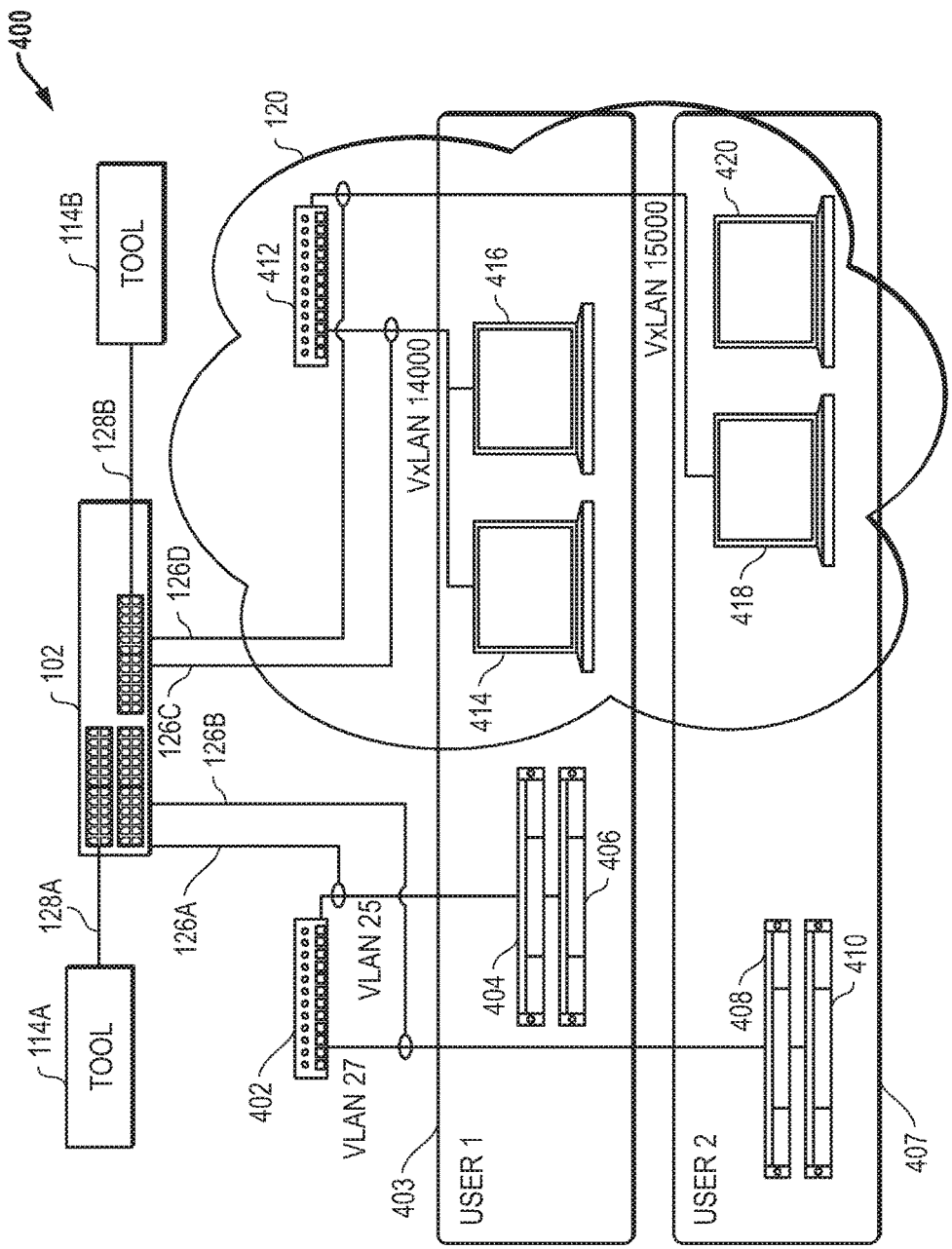
FIG. 4A provides an example embodiment for a cloud-based monitoring system where two users are sharing processing resources that are controlled by a server cloud service provider.

FIG. 4A provides an example embodiment 400 for cloud-based monitoring system where two users are using processing resources that are controlled by a hosted server service provider (e.g., Amazon Web Services). The hosted server cloud systems include hosted collocated servers 404, 406, 408, and 410 as well as a collocated cloud server 120. The collocated cloud server 120 includes virtual server instances 414, 416, 418, and 420. The router 402 is connected to collocated servers 404, 406, 408, and 410 and routes traffic between these collocated servers and external user systems. The router 412 is connected to virtual server instances 414, 416, 418, and 420 and routes traffic between these virtual server instances and external user systems.

The processing resources 403 for the first user includes collocated servers 404 and 406. Collocated servers 404 and 406 send and receive network traffic with router 402 using a VLAN (virtual local area network) protocol and a VLAN identifier (ID) that has been assigned to the first user, which is VLAN 25 for embodiment 400. The processing resources 403 for the first user also includes virtual server instances 414 and 416. Collocated virtual server instances 414 and 416 send and receive network traffic with router 412 using a VXLAN (virtual extensible local area network) protocol and a VXLAN identifier (ID) that has been assigned to the first user, which is VXLAN 14000 for embodiment 400.

Similarly, the processing resources 407 for the second user includes collocated servers 408 and 410. Collocated servers 408 and 410 send and receive network traffic with router 402 using a VLAN (virtual local area network) protocol and a VLAN identifier (ID) that has been assigned to the second user, which is VLAN 27 for embodiment 400. The processing resources 407 for the second user also includes virtual server instances 418 and 420. Collocated virtual server instances 418 and 420 send and receive network traffic with router 412 using a VXLAN (virtual extensible local area network) protocol and a VXLAN identifier (ID) that has been assigned to the first user, which is VXLAN 15000 for embodiment 400.

The cloud-based network tool optimizer 102 receives copies of network packets for the first user' s network traffic with respect to its assigned servers 404 and 406 through network tap connection 126A. The cloud-based network tool optimizer 102 receives copies of network packets for the first user's network traffic with respect to its assigned virtual server instances 414 and 416 through network tap connection 126C. The cloud-based network tool optimizer 102 receives copies of network packets for the second user's network traffic with respect to its assigned servers 408 and 410 through network tap connection 126B. The cloud-based network tool optimizer 102 receives copies of network packets for the second user's network traffic with respect to its assigned virtual server instances 418 and 420 through network tap connection 126D. As described above, the cloud-based network tool optimizer 102 operates to forward packets received from the network tap connections 126A, 126B, 126C, and 126D according to user filters defined and managed through the user interfaces for the cloud-based network tool optimizer to the extent these user filters do not conflict with master filters set by entity that controls the server processing resources.

As the cloud-based network tool optimizer 102 is connected within the internal network for the server provider, the cloud-based network tool optimizer 102 will see a mix of traffic belonging to the cloud server provider, the first user, and the second user. The traffic for the cloud service provider will be untagged. The traffic for the first user will be on VLAN 25 or on VXLAN 14000. And the traffic for the second user will be on VLAN 27 or on VXLAN 15000. The tools 114A and 114B could be tools attached to the cloud-based network tool optimizer 102 through connections 128A and 128B as physical devices or can be NFV (network functions virtualization) instances within the internal network for the service provider. Advantageously, the cloud-based network tool optimizer 102 allows the service provider to provide tool monitoring functionality to the first user and to the second user without exposing its own traffic to these users and without exposing each user's traffic to the other user. Further, the service provider does not need to expose the users to the details of its internal network infrastructure including the fact that a mix of VLAN and VXLAN technologies are being used to provide the processing resources to the users.

Figure 4B:
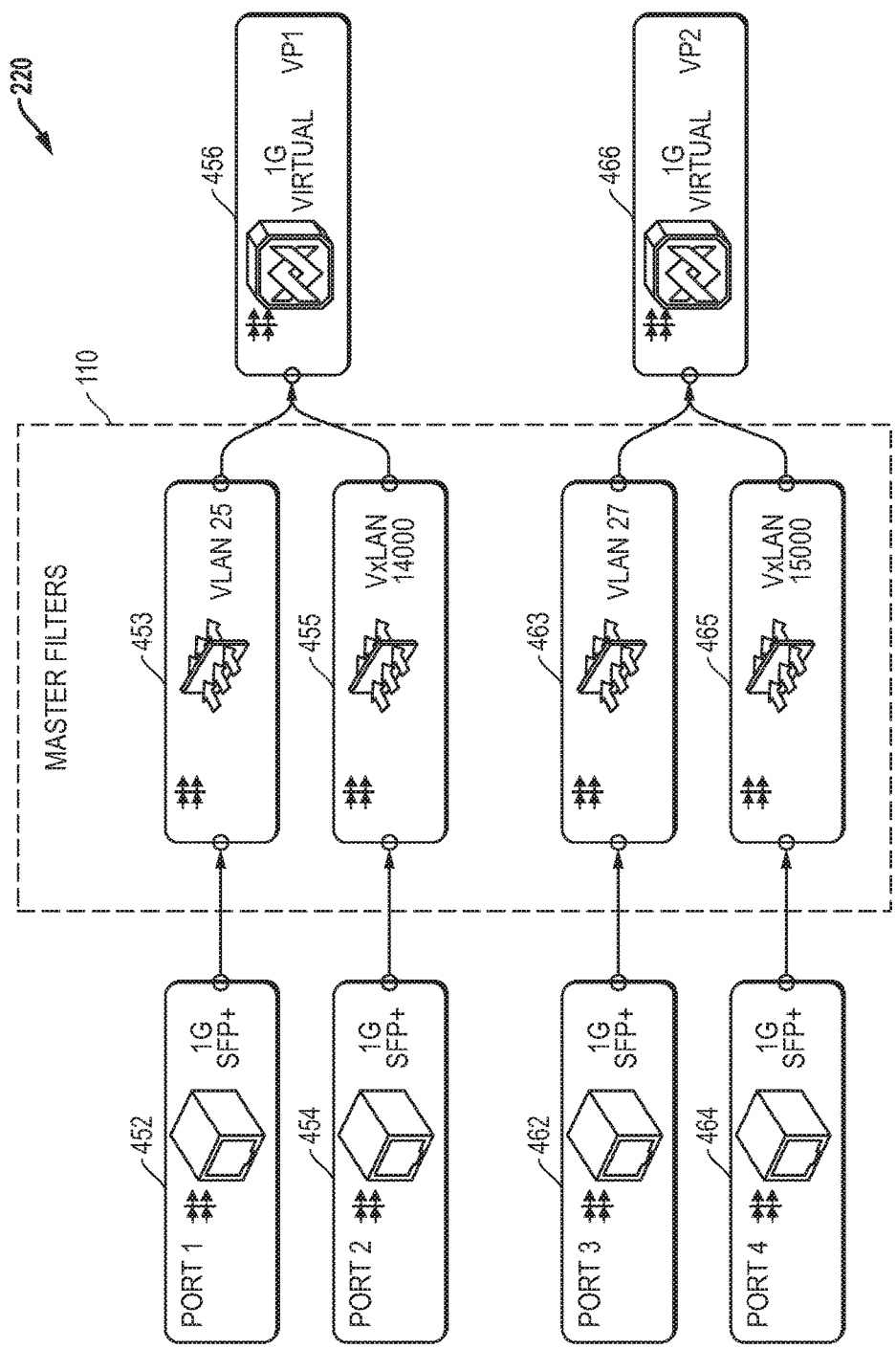
FIG. 4B is an example embodiment for a master user interface associated with the embodiment of FIG. 4A.

FIG. 4B is an example embodiment for a master user interface 220 associated with the embodiment of FIG. 4A. The service provider accesses and uses this master user interface 220 to configure master filters 110 so that each user's traffic is separated from the service provider's traffic and the other user's traffic. The first user's traffic is filtered by the filters 453 and 455 defined within the master filters 110 and then provided to a first virtual port (VP1) 456. Similarly, the second user's traffic is filtered by the filters 463 and 465 defined within the master filters 110 and then provided to a second virtual port (VP2) 466. As described below, the virtual ports 456 and 466 are used to represent input ports for the user interfaces that provide user packets that can be controlled by the user filters.

Looking to the first user's traffic, a first port 452 receives traffic from the first user's collocated servers 404 and 406, such as through tap connection 126A. This traffic is then filtered by a filter 453 so that the first virtual port (VP1) 456 receives only VLAN 25 traffic associated with the first port 452. The filter 453 can also be configured to strip off the VLAN tags from the packets before providing them to virtual port 456. Similarly, a second port 454 receives traffic from the first user's collocated virtual server instances 414 and 416, such as through tap connection 126C. This traffic is then filtered by a filter 455 so that the first virtual port (VP1) receives only VXLAN 14000 traffic associated with the second port 454. The filter 455 can also be configured to strip off the VXLAN tags from the packets before providing them to virtual port 456. It is noted that the input ports 452 and 454 can be, for example, one gigabyte per second fiber optic connections (e.g., SFP+ connections). It is also noted that the first virtual port (VP1) 456 can represent a one gigabyte virtual port.

Looking to the second user's traffic, a third port 462 receives traffic from the second user's collocated servers 408 and 410, such as through tap connection 126B. This traffic is then filtered by a filter 463 so that the second virtual port (VP2) 466 receives only VLAN 27 traffic associated with the third port 462. The filter 463 can also be configured to strip off the VLAN tags from the packets before providing them to virtual port 466. Similarly, a fourth port 464 receives traffic from the second user's collocated virtual server instances 418 and 420, such as through tap connection 126D. This traffic is then filtered by a filter 465 so that the second virtual port (VP2) receives only VXLAN 15000 traffic associated with the fourth port 464. The filter 465 can also be configured to strip off the VXLAN tags from the packets before providing them to virtual port 466. It is noted that the input ports 462 and 464 can also be, for example, one gigabyte per second fiber optic connections (e.g., SFP+ connections). It is further noted that the second virtual port (VP2) 466 can represent a one gigabyte virtual port.

In operation, therefore, the master filters 110 controlled by the service provider cause packets from the port(s) carrying traffic for the first user's physical servers 404 and 406 to be filtered down to traffic tagged with VLAN 25 prior to its being provided to the first virtual port 456. Similarly, master filters 110 cause packets from port(s) carrying traffic for the second user's physical servers 408 and 410 to be filtered down to traffic tagged with VLAN 27 prior to its being provided to the second virtual port 466. With respect to the traffic from the cloud server 120, the master filters 110 cause only packets tagged with VXLAN 14000 (i.e., the first user's traffic) to be forwarded to the first virtual port 456, and the master filters 110 cause only packets tagged with VXLAN 15000 (i.e., the second user's traffic) to be forwarded to the second virtual port 466. The VLAN 25 traffic and the VXLAN 14000 traffic, therefore, is combined at the first virtual port 456 and logically represents all of the first user's traffic within the service provider's network, but only the first user's traffic. Similarly, the VLAN 27 traffic and the VXLAN 15000 traffic is combined at the second virtual port 466 and logically represents all of the second user's traffic within the service provider's network, but only the second user's traffic. As indicated above, the VLAN and VXLAN tags can also be stripped from the packets by the filters 453, 455, 463, and 465 prior to the packets being forwarded to the virtual ports 456 and 466.

Figure 4C:
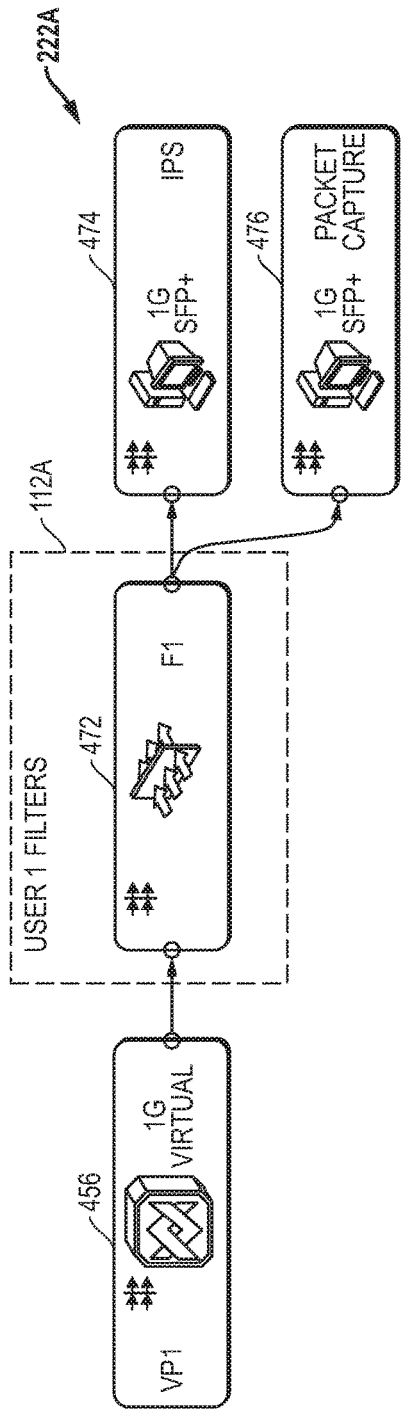
FIG. 4C is an example embodiment for a first user interface associated with the embodiment of FIG. 4A.

FIG. 4C is an example embodiment for a first user interface 222A associated with the embodiment of FIG. 4A. The first user accesses and uses this first-user user interface 222A to configure the first user filters 112A so that the input traffic is forwarded to monitoring tools 474 and 476 as desired by the first user. However, the packets that are processed by the first user filters 112A are limited to the first user's traffic that is received at the first virtual port (VP1) 456, as described above. For the embodiment depicted, a filter 472 receives the packets from the first virtual port (VP1) 456 and forwards copies of these packets to a first monitoring tool 474 and to a second monitoring tool 476. It is noted that the input ports for the monitoring tools 474 and 476 can be, for example, one gigabyte per second fiber optic connections (e.g., SFP+ connections). It is further noted that the first monitoring tool 474 can be, for example, an intrusion prevention system (IPS), and the second monitoring tool 476 can be, for example, a packet capture tool. Other variations and tools could also be used.

Advantageously, when the first user accesses the first user interface 222A, the first user does not see the physical details of the service provider's network. Rather, the virtual port 456 is displayed to the first user, and it effectively becomes a network input port for the first user interface 22A that is receiving the first user's traffic. The first user interface 222A then allows the first user to route and filter that traffic using the first user filters 112A.

Figure 4D:
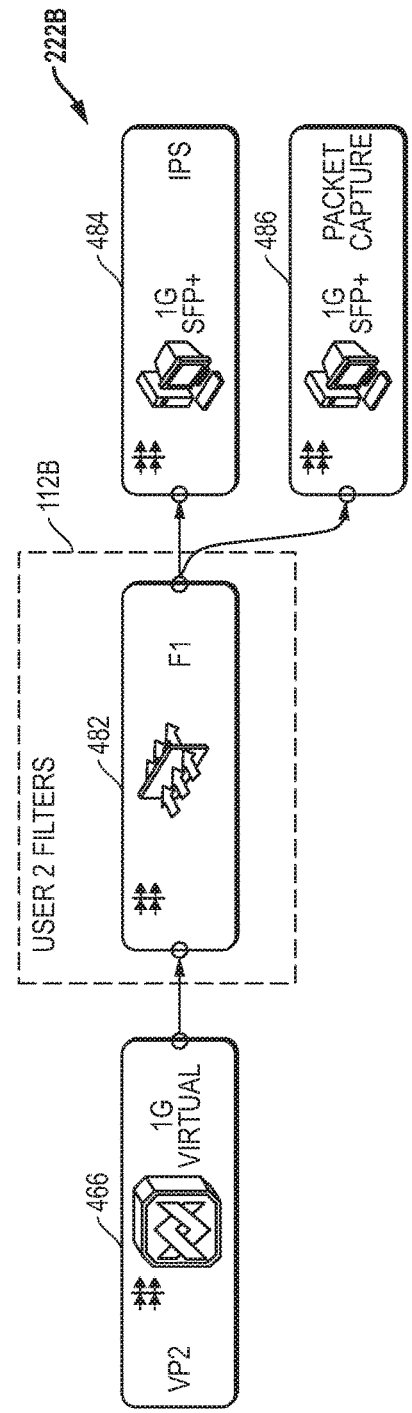
FIG. 4D is an example embodiment for a second user interface associated with the embodiment of FIG. 4A.

FIG. 4D is an example embodiment for a second user interface 222B associated with the embodiment of FIG. 4A. The second user accesses and uses this second-user user interface 222B to configure the second user filters 112B so that the input traffic is forwarded to monitoring tools 484 and 486 as desired by the second user. However, the packets that are processed by the second user filters 112B are limited to the second user's traffic that is received at the second virtual port (VP2) 466, as described above. For the embodiment depicted, a filter 482 receives the packets from the second virtual port (VP2) 466 and forwards copies of these packets to a first monitoring tool 484 and to a second monitoring tool 486. It is noted that the input ports for the monitoring tools 484 and 486 can be, for example, one gigabyte per second fiber optic connections (e.g., SFP+ connections). As with the embodiment in FIG. 4C, it is further noted that the first monitoring tool 484 can be, for example, an intrusion prevention system (IPS), and the second monitoring tool 486 can be, for example, a packet capture tool. Other variations and tools could also be used.

As with the first user, when the second user accesses the second user interface 222B, the second user does not see the physical details of the service provider's network. Rather, the virtual port 466 is displayed to the second user, and it effectively becomes a network input port for the second user interface 222B that is receiving the second user's traffic. The second user interface 222B then allows the second user to route and filter that traffic using the second user filters 112B.

When the filter rules compiler 306 combines the master filters 110 and the user filters 112A/112B, the rules complier 306 can effectively remove the virtual ports 456 and 466 which were used in the user interfaces 222A/222B to hide the cloud network infrastructure from the users. The rules compiler 306 first generates rules for filter engines based upon the master filters 110. These master related filter engine rules will have higher priority and be processed before the filter engine rules generated for the user filters. After generating the filter engine rules for the master filters 110, the rules compiler 306 can then generates lower priority filter engine rules based upon the user filters 112A and 112B. The priority of execution can be set, for example, by placing the high priority rules to be executed first within a given filter engine, such as an ingress filter engine. In addition, priority of execution can be set by placing higher priority rules in ingress engines and lower priority rules in egress engines that receive packets according to the forwarding actions set forth in the ingress engines. For example, if the master filter rule applied to an ingress engine associated with an input port allows only a first user's traffic to reach an egress engine associated with an output port, that egress engine can only affect how that first user's traffic is passed or dropped before being allowed to be output through the output port. Because the rules compiler 306 can combine and analyze both the master filters 110 and the user filters 112A and 112B, therefore, the rules compiler 306 can effectively remove the virtual ports 456/466 shown in the user interfaces 222A/222B and generate appropriate filter engine rules to be applied to the filter engines within the cloud-based network tool optimizer 102.

The following tables represent example rules that can be set up in ingress and egress filter engines to handle the monitoring example described with respect to FIGS. 4A-D. The first table provides example ingress filter engine rules to forward all user traffic to the destination ports for monitoring tools desired to be used by the users. Non-user traffic is to be dropped. The remaining tables provide example egress filter engine rules assuming that the users desired only particular ranges of source port (SP) addresses and destination port (DP) addresses to be passed to the monitoring tools. All other packets are to be dropped. It is noted that an ingress filter engine is associated with each input port, and an egress engine is associated with each output port.

Example Tables—Ingress/Egress Rules

| Filter Value | Forwarding Action |
|---|---|
| Ingress Filter Engine - Each Input Port (InputPorts1-4) (defined by master filter) | |
| VLAN 25 | OutputPort1, OutputPort2 |
| VXLAN 14000 | OutputPort1, OutputPort2 |
| VLAN 27 | OutputPort3, OutputPort4 |
| VXLAN 15000 | OutputPort3, OutputPort4 |
| * | DROP |
| Egress Filter Engine - OutputPort1 (defined by User 1 filter) | |
| SP-Range1, DP-Range1 | PASS |
| * | DROP |
| Egress Filter Engine - OutputPort2 (defined by User1 filter) | |
| SP-Range2, DP-Range2 | PASS |
| * | DROP |
| Egress Filter Engine - OutputPort3 (defined by User 2 filter) | |
| SP-Range3, DP-Range3 | PASS |
| * | DROP |
| Egress Filter Engine - OutputPort4 (defined by User2 filter) | |
| SP-Range4, DP-Range4 | PASS |
| * | DROP |

For the tables above, it is assumed that the filter engine rules are processed in priority from top to bottom within the tables. As such, packets matching the criteria in higher priority rules will be forwarded according to those rules, and lower priority rules will not affect these packets as they will have already been forwarded according to a higher priority forwarding action. InputPorts1-4 represent the input ports 452, 454, 462, and 464 from the server cloud network. SP-Range1-4 and DP-Range1-4 represent SP and DP ranges that the users are selecting to forward to the output ports. OutputPort1 represents the output port connected to monitoring tool 474. OutputPort2 represents the output port connected to monitoring tool 476. OutputPort3 represents the output port connected to monitoring tool 484. And OutputPort4 represents the output port connected to monitoring tool 486. It is also noted that a "*" designation indicates that all values match the criteria, that a PASS designation indicates that packets matching the filter value are passed along, and that a DROP designation indicates that packets matching the filter values are discarded.

As indicated above, the tools 114A, 114B . . . 114C can also be shared tools such that packets from multiple users are sent to the same tool or group of tools. For example, the service provider could have a large array of packet capture tools sufficiently powerful to serve both the first user traffic and the second user traffic in the example above. For such an implementation, identifying tags can be added to or left within the user packets. For example, if VLAN 25 tagged packets represent traffic for the first user as per the example above, these VLAN 25 tags can be left within the packets that are sent to the shared tool. As such, the tool can identify and separate packets for different users. Further, if a user's packets are not tagged, tags such as VLAN or VXLAN tags can be added to the packets to allow the shared tool to identify and separate packet for different users. Other variations could also be implemented.

Cloud-Based Monitoring Example—Stripping/Adding Packet Identifiers

As described herein, it can be useful for the server cloud network to add tags, such as VLAN and VXLAN identifiers, to packets being routed within the server cloud network in order to identify traffic belonging to different users. For example, when a user's traffic within the server cloud network is encapsulated with identifying information by the controlling entity as this traffic traverses the controlling entity's network, such as by adding VLAN and/or VXLAN headers, the actual user packets on the physical network connections are altered from how they appear logically to the user within the user interfaces (UIs) for the users. Thus, while the user will logically see the packet without the internal network header, the header is still added to the user's packets when they are transmitted into the server cloud network in order to distinguish the user's packets from other users' traffic. Before the user's packets are returned to another system for the original user, the header is removed by the cloud server network. As such, the user has no visibility that the packet was temporarily altered by the controlling entity as part of transmitting it through the server cloud network.

When the controlling entity of the server cloud network creates a logical port in a user interface for the cloud-based network tool optimizer 102 that carries the user's traffic, such as virtual ports 456/466 in FIGS. 4B-D, it is desirable to hide internal headers for this user interface. From the user's point of view, therefore, the user will not see the internal headers (e.g., VLAN header, VXLAN header, etc.). Rather, the user defines and manages its filters as though this internal header was never present. In operation, when the master/user filters have fully processed the user's packets, the internal header (e.g., VLAN header, VXLAN header, etc.) can be replaced or added back to the packets before the packets go back into the server cloud network, for example, to be provided to a network tool, as described above.

Figure 5A:
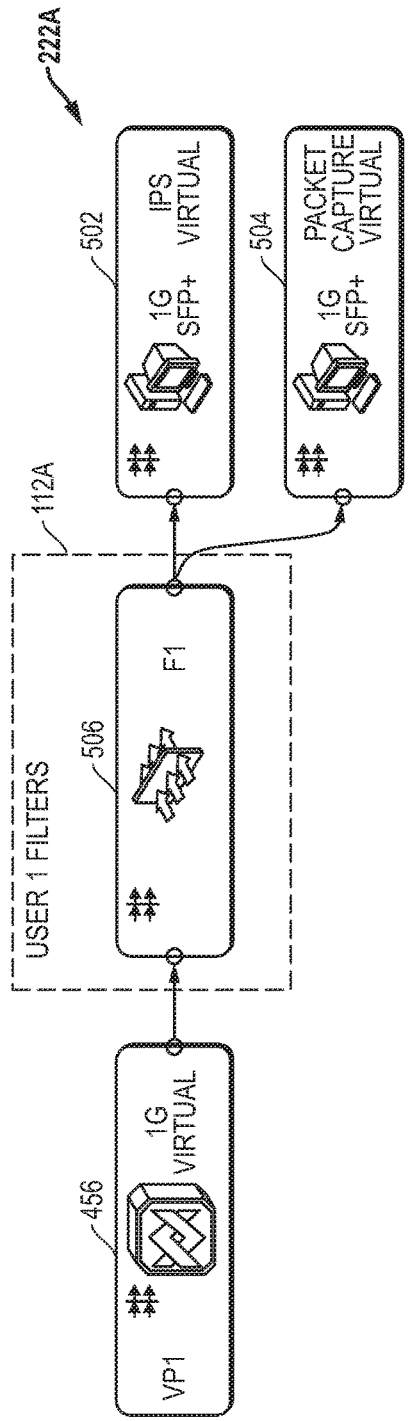
FIG. 5A is an example embodiment for a first user interface using virtual network tools.
Figure 5B:
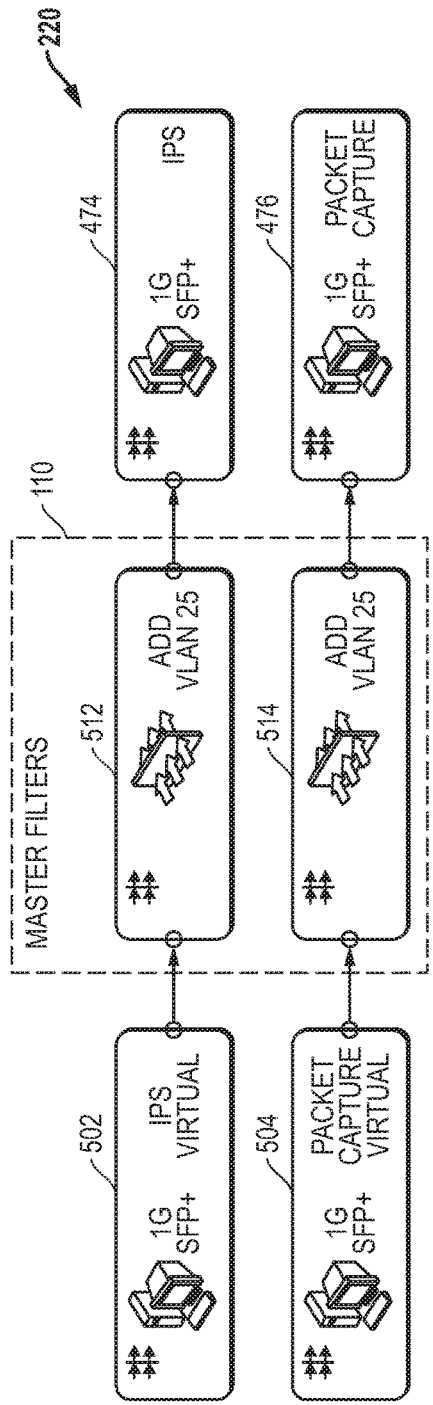
FIG. 5B is an example embodiment for a master user interface that includes additional defined filters that are associated with the virtual network tools of FIG. 5A.

To allow the controlling entity to define and manage filters that modify packets re-entering its server cloud network, virtual network tools can be used within the user interfaces for the users and within the master user interface. Within the user interfaces for the users, these virtual network tools represent the network tools to which the user wants to forward its traffic. Within the master user interface, these virtual network tools can then be used by the controlling entity to modify user packets re-entering its networks, for example, by defining filters that add back network identifiers (e.g., VLAN header, VXLAN header, etc.). FIGS. 5A-5B provide example user interfaces for such an implementation.

FIG. 5A is an example embodiment for a first user interface 222A similar to the user interface shown in FIG. 4C except that the network tools are now virtual network tools 502 and 504. The first user accesses and uses this first-user user interface 222A to configure the filter 506 within the first user filters 112A so that its input traffic is forwarded to virtual monitoring tools 502 and 504 as desired by the first user. As described above, the packets that are processed by the first user filters 112A are limited to the first user's traffic received at the first virtual port (VP1) 456. For the embodiment depicted, a filter 472 receives the packets from the first virtual port (VP1) 456 and forwards copies of these packets to a first virtual monitoring tool 502 and to a second virtual monitoring tool 504. It is noted that the input ports for the virtual monitoring tools 502 and 504 can be, for example, one gigabyte per second fiber optic connections (e.g., SFP+ connections). It is further noted that the first virtual monitoring tool 502 can be, for example, an intrusion prevention system (IPS), and the second monitoring tool 504 can be, for example, a packet capture tool. Other variations and tools could also be used while still utilizing the virtual monitoring tools.

When the first user accesses the first user interface 222A, therefore, the first user does not see the physical details of the service provider's network. Rather, the virtual port 456 is displayed to the first user, and it effectively becomes a network input port the is receiving the first user's traffic. The first user interface 222A then allows the first user to filter and forward that traffic using the user filter 506 within the first user filters 112A. The first user can also choose to forward its traffic to one or more network tools. These network tools can be virtual network tools, such as virtual tools 502 and 504 in FIG. 5A, for which additional filtering may be provided within the master user interface 220. These network tools may also be network tools, such as tools 474 and 476 in FIG. 4C, for which additional filtering is not provided within the master user interface 220. As such, depending upon the network monitoring tools within the server cloud and depending upon the monitoring resources desired to be made available by the controlling entity of the server cloud network, the controlling entity can determine whether network tool or virtual network tool representations are used in the user interface 222A.

FIG. 5B is an example embodiment where master user interface 220 includes additional filters 512 and 514 associated with virtual network tools 502 and 504. For the embodiment depicted, the master filters 110 includes a filter 512 that receives the first user traffic from the virtual network tool 502 and forwards this traffic to the first monitoring tool 474. The filter 512, for example, can add an internal network identifier, such as a VLAN header including a VLAN identifier (e.g., VLAN25), to the user packets prior to their being forwarded to the first monitoring tool 474. Similarly, the master filters 110 includes a filter 514 that receives the first user traffic from the virtual network tool 504 and forwards this traffic to the second monitoring tool 476. The filter 514, for example, can also add an internal network identifier, such as a VLAN header including a VLAN identifier (e.g., VLAN25), to the user packets prior to their being forwarded to the second monitoring tool 476. In this way, the first user's traffic can be identified at the network tools 474 and 476 that are receiving the first user's traffic.

When the filter rules compiler 306 combines the master filters 110 and the user filters 112A, the rules complier 306 can effectively remove the virtual tools 502/504 as well as the virtual port 456 which were used in the user interface 222A for the first user to hide the cloud network infrastructure from the first user. The rules compiler 306 first generates rules for filter engines based upon the master filters 453/455 that are placed before the virtual port 456 in FIG. 4B. These master related filter engine rules will have higher priority and be processed before the filter engine rules generated for the user filters. After generating the filter engine rules for filters 453/455, the rules compilers 306 can then generate lower priority filter engine rules based upon the user filter 112A that is placed between the virtual port 456 and the virtual tool ports 502/504. The rules compiler then processes the master filters 512/514 that are placed between the virtual tool ports 502/504 and the network tools 474/476. The filter engine rules for these subsequent master filters 512/514 will have lower priority than the filter engine rules for the user filter 112A, as the application of filters 512/514 will depend upon how packets were forwarded by the user defined filters 112A.

As described above, the priority of execution can be set, for example, by placing the high priority rules to be executed first within a given filter engine, such as an ingress filter engine. In addition, priority of execution can be set by placing higher priority rules in ingress engines and lower priority rules in egress engines that receive packets according to the forwarding actions set forth in the ingress engines. For example, if a master filter rule in an ingress engine associated with an input port allows only a first user's traffic to reach an egress engine associated with an output port, that egress engine can only affect how that first user's traffic is passed or dropped before being processed by the subsequent master filters and allowed to be output through the output port. Because the rules compiler 306 can combine and analyze both the master filters 110 and the user filters 112A, therefore, the rules compiler 306 can effectively remove the virtual ports 456 and virtual network tools 502/504 shown in the user interface 222A and generate appropriate filter engine rules to be applied to the filter engines within the cloud-based network tool optimizer 102. It is further noted that additional virtual representations can also be used within the user interfaces, if desired, and the rules compiler 306 can be configured to remove them in generating the filter engine rules applied within the cloud-based network tool optimizer 102.

The following tables represent example rules that can be set up in ingress and egress filters engines to handle the monitoring example described with respect to FIGS. 5A-5B. The first table provides example ingress filter engine rules to forward all user traffic to output ports for monitoring tools desired to be used by the user. Non-user traffic is to be dropped. The remaining tables provide example egress filter engine rules assuming that the user desired only particular ranges of source port (SP) addresses and destination port (DP) addresses to be passed to the monitoring tools and assuming that the controlling entity desires to add internal network identifiers back to the packets. All other packets are to be dropped. It is noted that an ingress filter engine is associated with an input port and an egress engine is associated with each output port.

Example Tables—Stripping/Adding Identifiers

| Filter Value | Forwarding Action |
|---|---|
| Ingress Filter Engine - Port 1 (defined by master filter) | |
| VLAN 25 | Strip VLAN Header and Send to OutputPorts1-2 |
| * | DROP |
| Egress Filter Engine - OutputPort1 (defined by User1 filter and subsequent master filter) | |
| SP-Range1, DP-Range1 | Add VLAN25 Header and PASS |
| * | DROP |
| Egress Filter Engine - OutputPort2 (defined by User1 filter and subsequent master filter) | |
| SP-Range1, DP-Range1 | Add VLAN25 Header and PASS |
| * | DROP |

For the example above, therefore, that a user's traffic is encapsulated with a VLAN header when it passes through the controlling entity's network, and the VLAN identifier is VLAN 25. This VLAN identifier is stripped from packets at the ingress port, and this VLAN identifier is then added back to the packets at the egress port prior to their being output from the egress ports.

It is further noted that the filter engine rules can be further streamlined by the filter rules compiler 306 where the same internal header is being stripped and then added back to the packets. As can be seen in the tables above, a VLAN25 header is used as the initial internal network identifier for the first user's traffic, and this same VLAN25 header is added back in the egress engines. As such, the filter engine rules can effectively remove the stripping and adding back of the same internal network identifier. The tables below provide an example for these streamlined filter engine rules.

Example Tables—Streamlined

| Filter Value | Forwarding Action |
| --- | --- |
| Ingress Filter Engine - Port 1 (defined by master filter) | |
| VLAN 25 | Send to OutputPorts1-2 |
| * | DROP |
| Egress Filter Engine - Output Port1 (defined by User1 filter and subsequent master filter) | |
| SP-Range1, DP-Range1 | PASS |
| * | DROP |
| Egress Filter Engine - Output Port2 (defined by User1 filter and subsequent master filter) | |
| SP-Range1, DP-Range1 | PASS |
| * | DROP |

It is recognized, therefore, that the stripping/adding of the internal network identifiers shown in the master user interface 220 and the user interfaces 222 for the users of the cloud resources provide a useful abstraction for the creation of master filters 110 and user filters 112. However, these abstractions along with virtual representations can be effectively removed by the filter rules compiler 306 in generating the actual filter engine rules that are applied to the filter engines and that determine how user packets are in fact forwarded from input ports for the cloud-based network tool optimizer 102 to output ports for the cloud-based network tool optimizer 102.

* * *

It is noted that one significant advantage of the master/user filters 110/112 and master/user user interfaces 220/222 described herein is that changes within the service provider network can be made without being visible to the users and without impacting or breaking the user forwarding actions set forth in the user filters. For example, if the service provider moves the first user to a different VLAN ID, this change can be updated by the service provider through the master filters 110. Advantageously, this change will not affect the first user's filters 112A or user interface 222A for the first user as the first user's traffic will still be received at a virtual port for that user once the service provider makes appropriate adjustments to the master filters 110. As another example, if the service provider relocates the second user's virtual server instances to different physical servers and/or a different VXLAN ID, this change again will not affect the second user's filters 112B or the user interface 222B for the second user as the second user's traffic will still be received at a virtual port for that user once the service provider makes appropriate adjustments to the master filters 110.

It is further noted that the modifications to the master filters 110 can be automated such that new server resources allocated to a user will cause the master filters 110 to be automatically adjusted so that the user's traffic will be forwarded to the user's virtual port. For example, if the first user in the examples above is allocated a new virtual server instance that uses a new VXLAN ID (e.g., VXLAN 16000), a new service command packet can be communicated from the master controller 125 to the cloud-based network tool optimizer 102 that includes the new VXLAN ID and the user information. Using this information, the cloud-based network tool optimizer 102 then automatically adjusts the master filters 110 such that packets having the new VXLAN ID are also sent to the virtual port for the first user.

It is again noted as indicated above that the destination tools 114A, 114B . . . 114C can be virtual tool instances formed as NFV (network functions virtualization) appliances within the cloud server for the service provider (e.g., Amazon Web Services). As such, tool port representations within the user interfaces 222A, 222B . . . 222C can represent logical tools in addition to physical tools. As such, when a user sets up a rule to forward packets from its traffic to a tool port, this tool port can be implemented using an NFV appliance. Further, when a user makes a new filter connection, the cloud-based network tool optimizer 102 can notify the master controller 125 for the service provider's network, and a new tool instance can be created for the user within the server cloud network for the service provider. As such, new tool services for the service provider can be automatically initiated by a user through the cloud-based network tool optimizer 102.

It is also noted that the operational blocks described herein can be implemented using hardware, software or a combination of hardware and software, as desired. In addition, integrated circuits, discrete circuits or a combination of discrete and integrated circuits can be used, as desired, that are configured to perform the functionality described. Further, programmable integrated circuitry can also be used, such as FPGAs (field programmable gate arrays), ASICs (application specific integrated circuits), and/or other programmable integrated circuitry. In addition, one or more processors running software or firmware could also be used, as desired. For example, computer readable instructions embodied in a tangible medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, programmable circuitry (e.g., FPGAs), and/or processors to perform the processes, functions, and capabilities described herein. It is further understood, therefore, that one or more of the tasks, functions, or methodologies described herein may be implemented, for example, as software or firmware and/or other instructions embodied in one or more non-transitory tangible computer readable mediums that are executed by a CPU, controller, microcontroller, processor, microprocessor, or other suitable processing circuitry.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to control packet traffic for multiple users of cloud resources within a cloud network, comprising:
    allowing, through a master user interface, configuration of one or more master filters to determine how packets received from one or more packet sources are forwarded for different users of cloud resources within a cloud network;
    allowing, through one or more user interfaces, configuration of a plurality of sets of one or more user filters, each set of one or more user filters being associated with a different user of cloud resources within the cloud network and determining how packets are forwarded within the cloud network for that user to one or more packet destinations;
    generating filter rules based upon the one or more master filters and the plurality of sets of one or more user filters, the filter rules including master rules associated with the master filters and user rules associated the plurality of sets of one or more user filters;
    prioritizing the master rules over the user rules;
    receiving packets from the one or more packet sources; and
    forwarding the received packets to the one or more packet destinations so that packet traffic for each user is forwarded based at least in part upon the one or more master filters and the set of one or more user filters for that user;
    wherein the master user interface displays filter information only for master filters, and wherein the one or more user interfaces display filter information only for user filters; and
    wherein the one or more user interfaces comprise a separate user interface for each user.

2. The method of claim 1, further comprising displaying only information relating to each user in the user interface for that user.

3. The method of claim 1, wherein the prioritizing comprises prioritizing execution of the master rules over execution of the user rules so that packet forwarding provided by the master rules overrides packet forwarding provided by the user rules.

4. The method of claim 3, further comprising prioritizing execution of the master rules over execution of the user rules by processing the master rules before the user rules with respect to forwarding of the received packets.

5. The method of claim 1, wherein the one or more master filters are configured to separate network traffic for the different users of the cloud resources.

6. The method of claim 5, wherein the one or more master filters are configured to use one or more network identifiers for user packets to separate network traffic.

7. The method of claim 6, wherein the one or more network identifiers comprises at least one of virtual local area network (VLAN) identifiers or virtual extensible local area network (VXLAN) identifiers.

8. The method of claim 6, wherein the one or more network identifiers are added to the user packets and then removed from the user packets before being forwarded to the one or more packet destinations.

9. The method of claim 1, wherein the one or more packet destinations comprise one or more network monitoring tools within the cloud network.

10. The method of claim 9, wherein the one or more network monitoring tools comprise one or more network monitoring tool instances created within a processing system platform within the cloud network.

11. A system to control packet traffic for multiple users of cloud resources within a cloud network, comprising:
    a plurality of input ports to receive packets from one or more packet sources within a cloud network;
    a plurality of output ports to output packets to one or more packet destinations; and
    one or more integrated circuits including one or more processors configured to execute instructions embodied in one or more non-transitory computer readable mediums to:
        allow, through a master user interface, configuration of one or more master filters to determine how packets received from one or more packet sources are forwarded for different users of cloud resources within a cloud network;
        allow, through one or more user interfaces, configuration of a plurality of sets of one or more user filters, each set of one or more user filters being associated with a different user of cloud resources within the cloud network and determining how packets are forwarded within the cloud network for that user to one or more packet destinations;
        generate filter rules based upon the one or more master filters and the plurality of sets of one or more user filters, the filter rules including master rules associated with the master filters and user rules associated the plurality of sets of one or more user filters;
        prioritize the master rules over the user rules;
        receive packets from the one or more packet sources; and
        forward the received packets to the one or more packet destinations so that packet traffic for each user is forwarded based at least in part upon the one or more master filters and the set of one or more user filters for that user;
        wherein the master user interface displays filter information only for master filters, and wherein the one or more user interfaces display filter information only for user filters; and
        wherein the one or more user interfaces comprise a separate user interface for each user.

12. The system of claim 11, wherein each user interface is configured to display only information relating to its user.

13. The system of claim 11, wherein the master rules are configured to have priority in execution over of the user rules so that packet forwarding provided by the master rules overrides packet forwarding provided by the user rules.

14. The system of claim 13, wherein the master rules are configured to have priority in execution over the user rules by being processed before the user rules with respect to forwarding of the received packets.

15. The system of claim 11, wherein the one or more master filters are configured to separate network traffic for the different users of the cloud resources.

16. The system of claim 15, wherein the one or more master filters are configured to use one or more network identifiers for user packets to separate network traffic.

17. The system of claim 16, wherein the one or more network identifiers comprises at least one of virtual local area network (VLAN) identifiers or virtual extensible local area network (VXLAN) identifiers.

18. The system of claim 16, wherein the one or more integrated circuits are further configured to add the one or more network identifiers to and then remove the one or more network identifiers from the user packets before being forwarded to the one or more packet destinations.

19. The system of claim 11, wherein the one or more packet destinations comprise one or more network monitoring tools within the cloud network.

20. The system of claim 19, wherein the one or more network monitoring tools comprise one or more network monitoring tool instances created within a processing system platform within the cloud network.

* * * * *